United States Patent Office 3,609,917
Patented Oct. 5, 1971

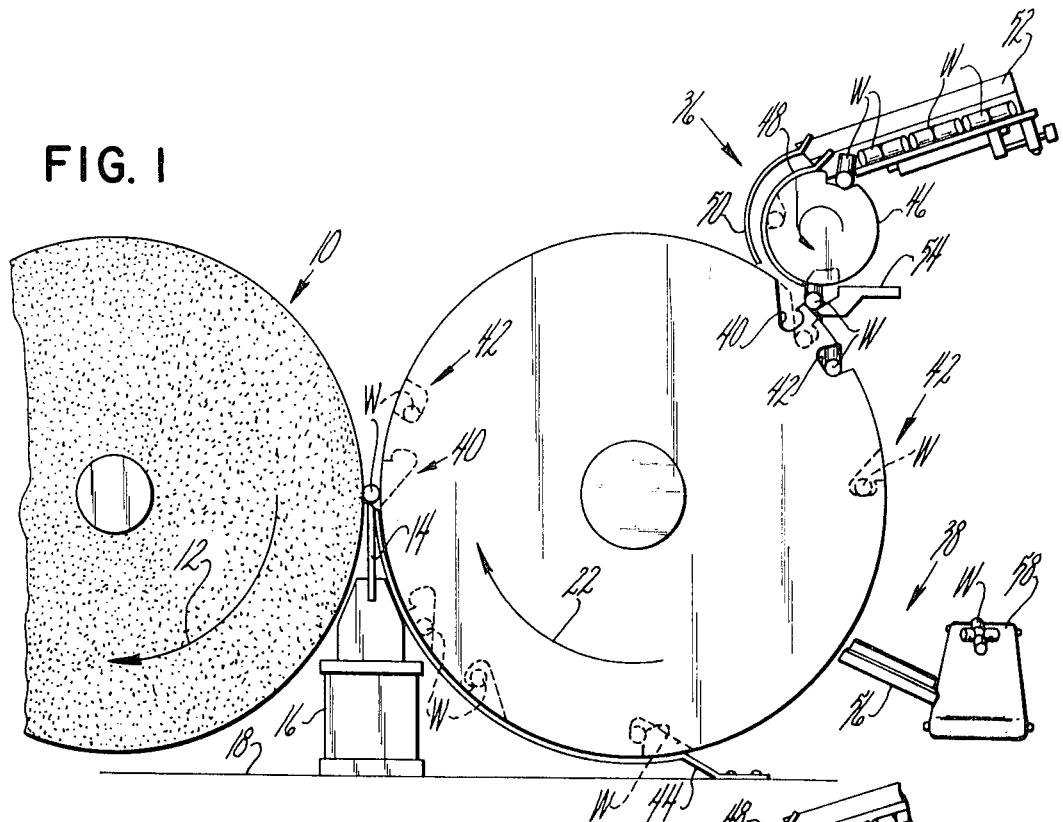
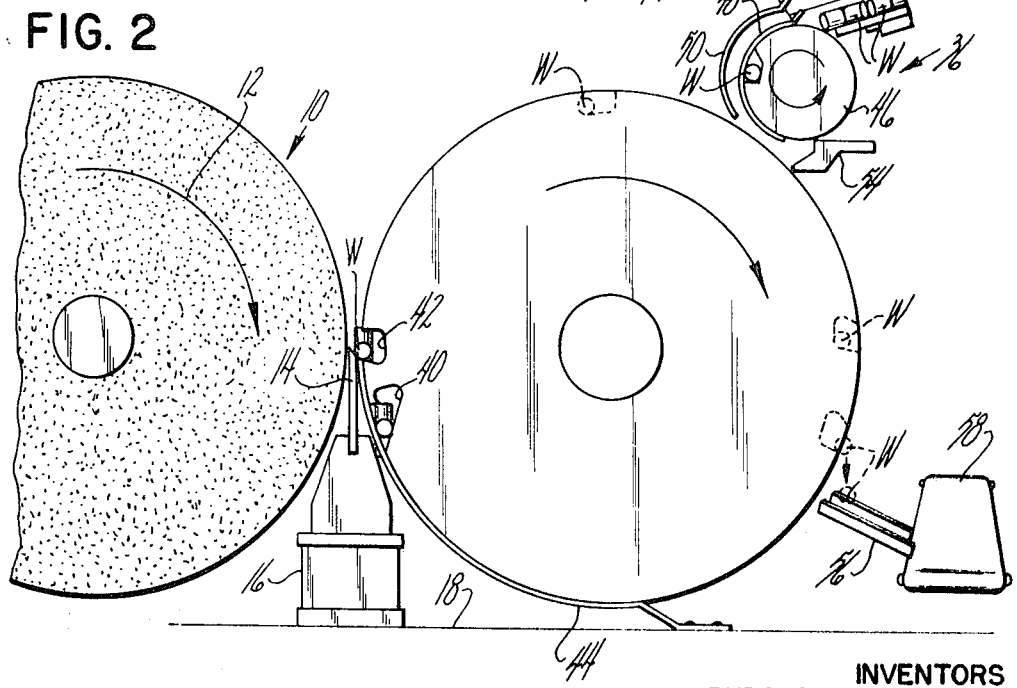

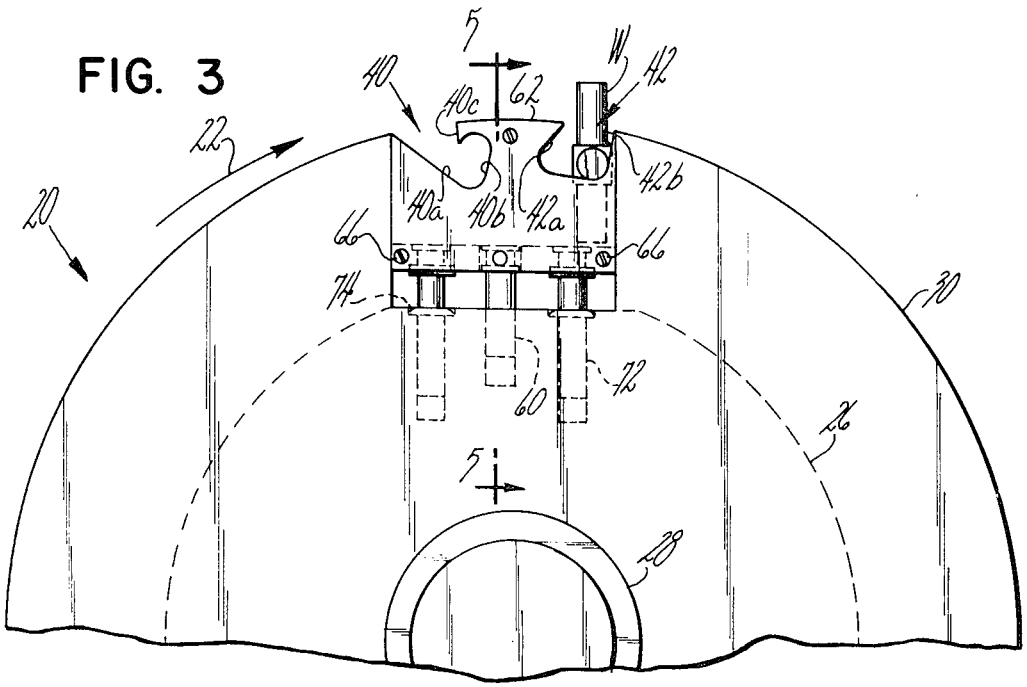
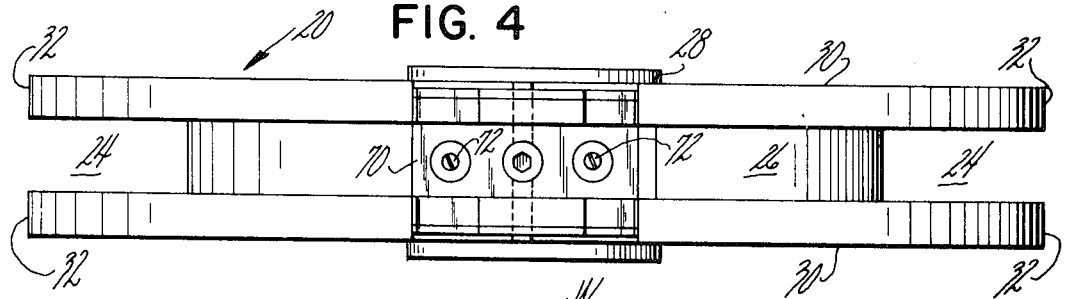
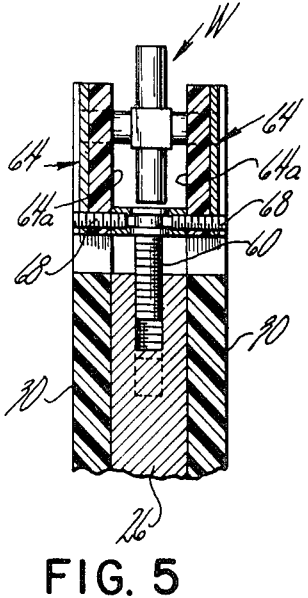

3,609,917
WORK HANDLING AND REGULATING WHEEL FOR CENTERLESS GRINDER
Rudolph A. Mattson, Springfield, and Frederick F. Groll, West Springfield, Mass., assignors to Universal American Corporation, Springfield, Mass.
Filed Jan. 16, 1969, Ser. No. 791,689
Int. Cl. B24b 5/18
U.S. Cl. 51—103 WH                     5 Claims

ABSTRACT OF THE DISCLOSURE

A centerless grinder has a grinding wheel and associated work regulating wheel for urging the workpiece being ground against the periphery of the grinding wheel, and a work rest blade between these wheels for supporting the workpiece as it is ground. The regulating wheel has a peripheral insert which defines an infeed notch for carrying one workpiece to the work rest blade and an outfeed notch for carrying the preceding workpiece away from said plate at least once per revolution of the regulating wheel. The workpieces are fed seriatim in timed relationship into the infeed notch at a station adjacent the upper surface of the continuously rotating regulating wheel, and are released from the outfeed notch at a station adjacent the lower surface of the regulating wheel.

SUMMARY OF INVENTION

This invention relates to centerless grinders, and deals more particularly with a novel regulating wheel for feeding workpieces to the work station of such a grinder, for holding the workpiece being ground, and for removing the ground workpiece from the work station as the wheel rotates continuously in one direction.

One object of the present invention is to provide a work handling mechanism for a centerless grinder of the foregoing character, which mechanism is particularly well adapted to feed workpieces of irregular shape to the work station of such a machine, that is for feeding workpieces having axially opposed ends which are to be ground, but which workpieces have a center section of enlarged diameter which may not even be axially symmetrical. The cross arms commonly used in automotive type universal joints are one example of the irregular workpieces of the type referred to herein.

Such workpieces cannot be loaded, or ground, or unloaded by conventional techniques because the grinding wheel either comprises two axially spaced wheels, or a single wheel with a deep peripheral annular groove suitable for grinding both ends of the workpiece at the same time. The regulating wheel of the present invention has a cooperating groove, and has infeed and outfeed notches for handling such workpieces as they are fed, and as they are removed from the work station. More particularly, for each revolution of the regulating wheel one workpiece is loaded and carried to the work station where it drops out of the infeed notch onto the work rest blade. This workpiece is ground as the regulating wheel continuously rotates until the infeed notch is fed a second workpiece at said infeed station. As the second workpiece is carried to the work station the continuous grinding of the first workpiece continues until it drops into an outfeed notch, adjacent the infeed notch containing the second workpiece. The regulating wheel thus carries the ground workpiece away just before the second workpiece is dropped onto the work rest blade, and said ground workpiece is ultimately deposited in a chute for further handling as required in the particular installation.

BRIEF DESCRIPTION OF DRAWINGS

FIG. 1 is an elevational view showing in schematic fashion a centerless grinder equipped with a regulating wheel constructed in accordance with the present invention, and also showing the infeed notch just prior to receiving a second workpiece, the outfeed notch being shown with a ground workpiece therein. It is further noted that the orientation of the workpiece in the single infeed notch is depicted in several successive positions in broken lines around the periphery of said regulating wheeel.

FIG. 2 is a view similar to FIG. 1 but showing the infeed notch just prior to depositing the second workpiece at the work station, and also showing the ground workpiece being withdrawn from the work station for movement around the periphery of the wheel to a discharge station. Successive locations of the single outfeed notch are shown in broken lines around the periphery of the wheel in this view also.

FIG. 3 is a detailed elevational view of the upper portion of the regulating wheel showing the construction of the infeed and outfeed notches with respect to the periphery of said wheel.

FIG. 4 is a plan view of the regulating wheel shown in FIG. 3.

FIG. 5 is a sectional view taken on line 5—5 of FIG. 3 showing a workpiece in broken lines.

DETAILED DESCRIPTION

Turning now to the drawings in greater detail, FIG. 1 shows a grinding wheel 10 which may be of a conventional abrasive type and is adapted to be continuously rotated in the direction of the arrow 12 by suitable means (not shown). A work rest blade 14 is supported on a suitable work rest 16 which may be of conventional construction and is mounted to the bed 18 of the grinder as shown.

In accordance with the present invention a regulating wheel 20 is continuously rotated about an axis parallel to the axis of rotation of the grinding wheel 10 in the direction of the arrow 22. It is an important feature of the present invention that the regulating wheel 20 and work rest blade 14 as well as the grinding wheel 10 are adapted to grind workpieces of irregular shape, and more particularly to grind axially opposed ends of such workpieces where center sections thereof may be of enlarged diameter or may be axially unsymmetrical as for example are the cross arms commonly used in automotive type universal joints. Therefore, and as best shown in FIG. 4 with respect to the regulating wheel 20, said wheel defines a rather deep annular groove 24 to accommodate the center section of such a workpiece W as shown in FIG. 5. Preferably, the grinding wheel 10 and the work rest blade 14 are similarly contoured so as to grind and support respectively the end portions of the workpiece W. The reader is referred to Pat. No. 2,911,763 issued to Todd et al. in 1959 and assigned to the asignee herein for a more complete description of the contouring of a gripping wheel and a work rest blade for accommodating irregularly shaped objects in a centerless grinder.

Turning now to a more complete description of the regulating wheel 20, FIG. 4 shows that this wheel may be made up of a core member 26 having a hub portion 28 for rotatably supporting the same, and including nylon peripherally extending flanged portions 30, 30 having outer lands for resiliently urging the workpiece W, and more particularly the end portions thereof, against cooperating abrasive surfaces on the grinding wheel 10. As will be apparent from the above mentioned patent, the grinding wheel 10 also includes a rather deep peripherally extending annular groove similar to the groove 24 mentioned hereinabove with respect to the regulating wheel 20. The outwardly extending flanges 30, 30 of the regulating wheel 20 also define a pair of closely spaced notches 40 and 42 one of which is adapted to receive a workpiece at the infeed station indicated generally at 36 in FIG. 1, and the other of which notches is adapted to carry the ground workpiece to the discharge station indicated generally at 38 in FIG. 1.

The infeed notch 40 has an inclined ramp surface 40a down which the workpiece W is adapted to slide when said workpiece has been transferred to the work station between the wheels 10 and 20 onto the upper edge of the work rest blade 14. This infeed notch 40 also has an inner surface 40b defined in part by the ramp surface 40a and a lip 40c for restraining the workpiece W as it is carried downwardly at the right hand side of the regulating wheel 20 between the position indicated generally at 42 and the upstream end of a fixed guide 44, which guide takes over when the workpiece W falls beyond the lip 40c as a result of the force of gravity acting upon the workpiece during the last 90 degrees of angular movement prior to reaching the work station. Thus, the stationary guide 44 extends from adjacent the bed 18 of the grinder in an arcuate fashion adjacent the perimeter of the regulating wheel to the work station where the work rest blade 14 is located. As mentioned above once the workpiece W has been raised to a position adjacent the work rest blade 14 the ramp surface 40a allows the workpiece W to slide downwardly into the position shown at W in FIG. 1 between the wheels 10 and 20. At this point in the cycle of operation of the regulating wheel 20 a major portion of the periphery of the wheel 20, characterized by the nylon lands 32, 32, will be effective to urge the workpiece W into contact with the grinding wheel 10 for the grinding operation. An outfeed notch 42 defined in the regulating wheel 20 adjacent the infeed notch 40, and located slightly ahead of said infeed notch in the direction of rotation 22 of the regulating wheel 20, will have removed the preceding workpiece from the work station for transport to the discharge station 38 mentioned previously. FIG. 2 shows such a workpiece W at the moment wherein the ground workpiece leaves the work rest blade 14 and is gravity fed inwardly with respect to the regulating wheel 20 as a result of the ramp surface 42a best shown in FIG. 3. This outfeed notch 42 also has a leading edge 42b across which the workpiece W is adapted to slide for discharge at the discharge station 38.

The infeed station 36 may include a notched feeding wheel 46 having fixed guides 48 and 50 associated therewith for guiding the ends of the workpiece to be ground, and for guiding the irregularly shaped center section thereof, as the workpiece W is fed from an inclined loading ramp 52 to the infeed notch 40. The use of such an infeed wheel 46 has been found to be of advantage where the regulating wheel 20 operates at a peripheral speed precluding direct gravity feeding of the workpieces W, W into the infeed notch 40. The regulating wheel 20, and infeed wheel 46 rotate at the same angular speed giving the infeed wheel 46 a considerably lower peripheral speed than that of the regulating wheel 20. Finally, a fixed guide 54 adjacent to the actual notched portion of the regulating wheel serves to guide the workpiece W as it drops into the infeed notch 40.

The discharge station 38 comprises a fixed chute 56 for receiving the workpiece W as it is dropped downwardly from the regulating wheel 20 and the chute in turn drops the workpiece onto a longitudinal extending conveyor 58 for transport to a suitable receptacle or other workpiece forming apparatus.

Turning now to a more complete description of the notch defining portion of the regulating wheel 20, FIG. 3 shows the adjacent notches 40 and 42 defined in an insert which is removably received at the periphery of the core 26 of the regulating wheel by means of a threaded stud 60. The core 26 includes a threaded bore which permits the relative radial position of the insert to be varied in order to provide a continuous peripheral outer surface of the wheel 20 defined in part by the lands 32 on the regulating wheel and in part by the arcuate portion 62 of the insert located between the infeed and outfeed notches 40 and 42 respectively. As best shown in FIG. 5, the insert comprises a U-shaped device having upstanding leg portions 64, 64 in which leg portions the notches 40 and 42 are defined. Inner segments of said leg portions may be constructed of nylon as indicated generally at 64a, 64a to prevent injury to the workpiece W as it drops into the infeed slot 40, and as it is transported from the work station to the discharge station in the outfeed slot 42. These leg portions 64, 64 also include thin metallic side locating plates which are attached to the nylon segments by screws indicated generally at 66, 66. The side plates have threaded openings adjacent the head portion of the threaded stud 60 for threadably receiving set screws 68, 68, the inner end portions of which set screws engage an annular groove in the headed end portion of the stud 60. As so constructed and arranged rotation of the set screws 68, 68 allow the leg portions of the U-shaped insert device to be axially aligned with the nylon lands 32, 32 of the regulating wheel. Finally, and still with reference to the U-shaped insert device, a spacer 70, comprising the web portion of the U-shaped insert and said spacer 70 has circumferentially spaced openings for receiving studs 72, 72. The studs 72, 72 are slidably received in generally radially extending openings defined in the core 26 of the regulating wheel. The upper ends of the studs 72, 72 are attached to the spacer 70 by screws 72, 72 and thereby serve to prevent the U-shaped insert device from rotating with respect to the threaded stud 60. The guiding studs 72, 72 are unthreaded and are preferably fitted with nylon scraper seals 74, 74 which prevent foreign matter from entering the generally radially extending openings in the core 26 of the regulating wheel.

We claim:

1. In a centerless grinding machine of the type having a grinding wheel continuously driven in one direction so as to urge a workpiece downwardly onto a blade-rest means, the improvement comprising a regulating wheel continuously driven in the same direction, a peripheral insert removably mounted in said regulating wheel and defining an infeed notch for receiving a gravity fed workpiece at an infeed station adjacent the periphery of said regulating wheel, said insert also defining an outfeed notch for receiving a ground workpiece at said work station, said outfeed notch located ahead of said infeed notch in the direction of rotation of said regulating wheel, a stationary arcuate guide for the underside of said regulating wheel for retaining a workpiece in said infeed notch as it is brought upwardly to the work station in the downwardly open infeed notch, infeed wheel means for feeding workpieces to said infeed station in timed relationship with movement of said infeed notch through said infeed station and said insert being radially adjustable with respect to said regulating wheel periphery.

2. The combination defined in claim 1 wherein said regulating wheel periphery includes axially spaced peripherally extending lands for engaging axially spaced portion of the workpiece being ground, said peripheral lands defining an annular recess therebetween which permits irregularly shaped workpieces to be so ground.

3. The combination defined in claim 2 wherein said notch defining insert comprises a U-shaped device having leg portions which define said notches, and said assembly also including threaded means for mounting said U-shaped device to said regulating wheel so that said leg portions can be axially aligned with said axially spaced peripheral lands, and said mounting means also including means for adjusting positioning the outermost ends of said leg portions in radial alignment with said resilient peripheral lands as aforesaid.

4. The combination defined in cclaim 3 wherein said threaded means for mounting said U-shaped insert device to said regulating wheel includes a threaded stud rotatably received in the web portion of said U-shaped device and threadably received in a generally radially extending hole in said wheel to allow radial adjustment of said device in said wheel.

5. The combination defined in claim 4 wherein said threaded means for mounting said U-shaped insert device to said wheel further includes a screw threadably received in each of said leg portions and having an inner end received in an annular slot in said threaded stud, said U-shaped insert device having its web portion defined by a spacer plate located between said leg portions and having an opening for rotatably receiving said threaded stud, and stud means for mounting said plate to said wheel so that it is free to slide radially with respect thereto but restrained against axial movement with respect thereto, whereby said leg portions can be adjusted toward and away from said spacer plate independently of one another.

References Cited

UNITED STATES PATENTS

| | | | |
|---|---|---|---|
| 2,427,283 | 9/1947 | Hopkins et al. | 51—103 |
| 2,911,763 | 11/1959 | Todd et al. | 51—103 |

FOREIGN PATENTS

| | | |
|---|---|---|
| 144,422 | 2/1962 | Russia. |

LESTER M. SWINGLE, Primary Examiner